A. B. HANSON.
FRUIT GATHERER.
APPLICATION FILED JAN. 29, 1913.
1,074,715.
Patented Oct. 7, 1913.
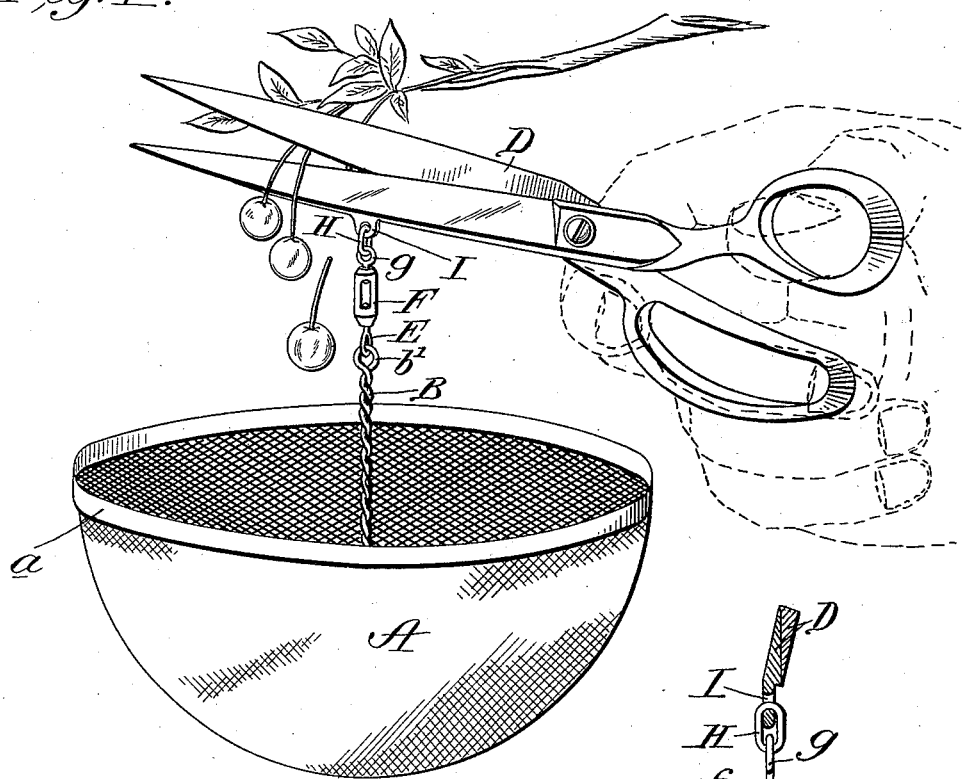
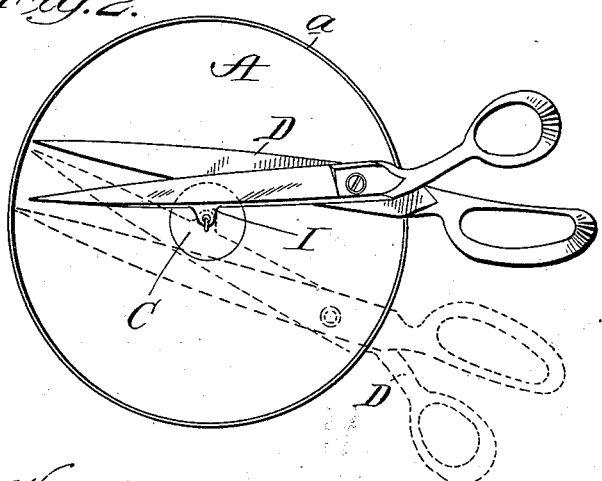
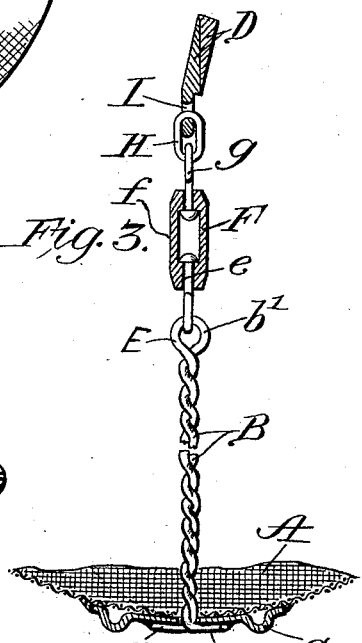
Inventor:
A. B. Hanson.
By his Attorneys:

UNITED STATES PATENT OFFICE.

AXEL B. HANSON, OF TRAVERSE CITY, MICHIGAN.

FRUIT-GATHERER.

1,074,715.    Specification of Letters Patent.    Patented Oct. 7, 1913.

Application filed January 29, 1913. Serial No. 744,923.

*To all whom it may concern:*

Be it known that I, AXEL B. HANSON, a citizen of the United States, residing at Traverse City, in the county of Grand Traverse and State of Michigan, have invented certain new and useful Improvements in Fruit-Gatherers, of which the following is a specification.

This invention relates to fruit gatherers for gathering small fruit, such as cherries, plums, and the like, in which a receptacle for the fruit is suspended from means for cutting the fruit and allowing it to drop into the receptacle.

According to my invention, I provide a receptacle of suitable construction in the interior of which is arranged a post which is rigidly connected with the bottom of the receptacle and which is connected at its upper end with a pair of shears. The connection between the upper end of the post and the shears is such that the shears may be turned in all directions relatively to the post without tipping the receptacle so that at all times, no matter how the shears may be arranged, the receptacle will remain in an upright position.

In the accompanying drawings:—Figure 1 is a perspective view of a fruit gatherer embodying my improvements, and this figure of the drawings illustrates how the shears are held and how the receptacle is suspended from the shears. Fig. 2 is a top plan view of the invention, and shows by dotted lines how the shears may be shifted without moving the receptacle. Fig. 3 is a view on an enlarged scale, partly in section and partly in elevation, showing the connection between the receptacle and the post and between the post and the shears.

The receptacle A for the fruit may be of any suitable construction. It is preferably, however, made of wire cloth and is preferably semi-spherical in shape, being fully open at the top. The top edge of the wire cloth is preferably bound or reinforced at *a*. From the middle portion of the receptacle rises a post B which may be made of twisted wire, as shown, or made in other suitable ways. The lower end of this post is rigidly secured, as shown in Fig. 3, to the bottom of the receptacle. This attachment may be made in the manner indicated, that is to say, the ends *b* of the wire may be turned at right angles below the bottom of the receptacle and between the ends of the wire and the wire cloth may be interposed a reinforcing plate C to secure strength and rigidity. The shears D, as is obvious, are of the usual construction. The upper end of the post B has an eye *b'* which couples with an eye E forming part of a swivel F. This eye has a stem *e* which is pivotally connected with the sleeve *f* of the swivel and above the sleeve is another eye *g*, the stem of which is pivotally connected with the sleeve *f*. This eye *g* is loosely connected with a link H which in like manner is loosely connected with the shears, in the manner shown, *i. e.*, by providing a perforated lug I on the shears and engaging the link with said lug. In this way the receptacle A is supported from the shears, being always arranged beneath them no matter how the shears may be moved or at what angle they may be disposed and therefore when the fruit is severed from the tree or vine it will always drop into the receptacle.

I claim as my invention:—

1. A fruit gatherer comprising a receptacle, a rigid post rigidly connected with the central portion thereof, a pair of shears, and a universal joint between the upper end of the post and the shears.

2. A fruit gatherer comprising a receptacle, a rigid post rigidly connected with the central portion thereof and extending upwardly above the top of said receptacle, a pair of shears and a universal joint connecting the shears and post.

3. A fruit gatherer comprising a receptacle, a rigid post rigidly connected with the central portion thereof and extending upwardly above its top, a pair of shears, a swivel, a flexible connection between the swivel and the upper end of the post, and a flexible connection between the swivel and the shears.

In testimony whereof, I have hereunto subscribed my name.

AXEL B. HANSON.

Witnesses:
  ROSA K. HANS,
  GEORGIA M. HANS.

Copies of this patent may be obtained for five cents each, by addressing the "Commissioner of Patents, Washington, D. C."